US012637113B2

(12) United States Patent
Chae et al.

(10) Patent No.: US 12,637,113 B2
(45) Date of Patent: May 26, 2026

(54) APPARATUS FOR CONTROLLING AUTONOMOUS DRIVING AND METHOD FOR THE SAME

(71) Applicants:Hyundai Motor Company, Seoul (KR); Kia Corporation, Seoul (KR)

(72) Inventors: Su Hong Chae, Hwaseong-si (KR); Ji Hwan Park, Seoul (KR); Young Jin Sung, Seoul (KR); Chan Hee Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 100 days.

(21) Appl. No.: 18/223,858

(22) Filed: Jul. 19, 2023

(65) Prior Publication Data

US 2024/0190479 A1    Jun. 13, 2024

(30) Foreign Application Priority Data

Dec. 13, 2022    (KR) ........................ 10-2022-0173892

(51) Int. Cl.
| | |
|---|---|
| *B60W 60/00* | (2020.01) |
| *B60W 30/095* | (2012.01) |
| *B60W 50/10* | (2012.01) |
| *B60W 50/14* | (2020.01) |

(52) U.S. Cl.
CPC ...... *B60W 60/0053* (2020.02); *B60W 30/095* (2013.01); *B60W 50/10* (2013.01);
(Continued)

(58) Field of Classification Search
CPC ........... B60W 60/0053; B60W 30/095; B60W 50/10; B60W 50/14; B60W 60/0059;
(Continued)

(56) References Cited

U.S. PATENT DOCUMENTS

| | | |
|---|---|---|
| 11,440,540 B2 | 9/2022 | Lee |
| 11,669,094 B2 | 6/2023 | Kim |

(Continued)

FOREIGN PATENT DOCUMENTS

| | | |
|---|---|---|
| JP | 2020-102144 A | 7/2020 |
| KR | 10-2020-0144319 A | 12/2020 |

(Continued)

*Primary Examiner* — Abdhesh K Jha
*Assistant Examiner* — Andrew Sang Kim
(74) *Attorney, Agent, or Firm* — Banner & Witcoff, Ltd.

(57) ABSTRACT

An apparatus for controlling autonomous driving and a method for the same are provided. The apparatus includes a sensor device provided in a vehicle to acquire information on a collision risk during autonomous driving of the vehicle, a user input sensing device to sense a control input, which is input from a user of the vehicle, for switching an autonomous driving mode, and a processor to determine a collision risk, based on the information acquired through the sensor device, to determine whether to switch the autonomous driving mode, based on the control input of the user, when the collision risk is determined as being present, and to control autonomous driving of the vehicle, based on a determination result of whether to switch the autonomous driving mode.

20 Claims, 7 Drawing Sheets

(52) U.S. Cl.
CPC ........ *B60W 50/14* (2013.01); *B60W 60/0059*
(2020.02); *B60W 2050/146* (2013.01); *B60W 2554/80* (2020.02)

(58) Field of Classification Search
CPC ....... B60W 2050/146; B60W 2554/80; B60W 60/0015; B60W 10/18; B60W 10/20; B60W 30/08; B60W 30/181; B60W 40/02; B60W 40/105; B60W 40/107; B60W 60/007; B60W 2050/0005; B60W 2050/007; B60W 2520/04; B60W 2520/10
See application file for complete search history.

(56) References Cited

U.S. PATENT DOCUMENTS

| | | | |
|---|---|---|---|
| 11,679,786 B2 | 6/2023 | Kim et al. | |
| 2014/0303827 A1* | 10/2014 | Dolgov | B60W 30/00 701/23 |
| 2016/0194000 A1* | 7/2016 | Taki | B60W 30/08 701/70 |
| 2017/0291602 A1* | 10/2017 | Newman | B60W 50/16 |
| 2017/0371334 A1* | 12/2017 | Nagy | G05D 1/0061 |
| 2018/0065635 A1* | 3/2018 | Urano | B60W 50/10 |
| 2018/0150074 A1* | 5/2018 | Hashimoto | B60W 60/0053 |
| 2018/0326994 A1 | 11/2018 | Sakai | |
| 2020/0398830 A1 | 12/2020 | Lee | |
| 2021/0080949 A1 | 3/2021 | Takeda et al. | |
| 2021/0290102 A1 | 9/2021 | Burwinkel et al. | |
| 2021/0300431 A1 | 9/2021 | Kim et al. | |
| 2021/0382487 A1 | 12/2021 | Kim | |
| 2022/0388504 A1 | 12/2022 | Lee | |

FOREIGN PATENT DOCUMENTS

| | | |
|---|---|---|
| KR | 10-2021-0072184 A | 6/2021 |
| KR | 10-2021-0119617 A | 10/2021 |
| KR | 102317921 B1 | 10/2021 |

* cited by examiner

| AUTOMATION PHASE | SAE CLASSIFICATION STANDARD | SYSTEM ROLE | DRIVER ROLE |
|---|---|---|---|
| LEVEL 0 | NO AUTOMATION | A SYSTEM IS TEMPORARILY INVOLVED INTO EMERGENCY SITUATION OR PROVIDES ONLY WARNING | A DRIVER DRIVES ALL DRIVING TYPES |
| LEVEL 1 | DRIVER ASSISTANCE | THE SYSTEM PERFORMS SOME DRIVING FUNCTIONS, SUCH AS STEERING OR ACCELERATION/DECELERATION, TOGETHER WITH DRIVER DRIVING, IN A NORMAL OPERATION SECTION, ON VEHICLE, | THE DRIVER DETERMINES AN OPERATION STATE/ TIMING OF SYSTEM IN LEVEL 1, PERFORMS OTHER DRIVING FUNCTIONS (INCLUDING DRIVING CONTEXT/ VEHICLE DRIVING/MONITORING OF SYSTEM IN LEVEL 1 AND INSTANTLY COPING WITH EMERGENCY SITUATION) EXCEPT FOR MANIPULATING OF A STEERING WHEEL OR AN ACCELERATION/ DECELERATION PEDAL. |
| LEVEL 2 | PARTIAL AUTOMATION | THE SYSTEM PERFORMS STEERING AND ACCELERATION/DECELERATION IN PLACE OF A DRIVER STEERING AND MONITORING ACCELERATION/ DECELERATION IN STATE THAT THE DRIVER GETS ON VEHICLE | THE DRIVER DETERMINES AN OPERATION STATE/ TIMING OF THE SYSTEM, PERFORMS OTHER DRIVING FUNCTIONS (INCLUDING DRIVING CONTEXT/VEHICLE DRIVING/MONITORING OF SYSTEM IN LEVEL 2 AND INSTANTLY COPING WITH EMERGENCY SITUATION) EXCEPT FOR MANIPULATING OF A STEERING WHEEL OR AN ACCELERATION/DECELERATION PEDAL. |
| LEVEL 3 | CONDITIONAL AUTOMATION | THE SYSTEM TRANSFERS A DRIVING CONTROL RIGHT TO THE DRIVER UNDER DRIVING SITUATIONS OTHER THAN A CONDITIONAL SITUATION AND PERFORMS A DRIVING FUNCTION SUCH AS STEERING AND ACCELERATION/ DECELERATION | THE DRIVER DETERMINES AN OPERATION STATE/ TIMING OF THE SYSTEM, AND PERFORMS OTHER DRIVING FUNCTIONS) EXCEPT FOR MANIPULATING OF STEERING WHEEL OR ACCELERATION/ DECELERATION PEDAL OR MONITORING A DRIVING CONTEXT (THE DRIVER IS ABLE TO COPE WITH AN EMERGENCY SITUATION BY RECEIVING A CONTROL RIGHT WHEN THERE IS A REQUEST FOR TRANSFERRING THE CONTROL RIGHT BY THE SYSTEM IN LEVEL 3.) |
| LEVEL 4 | HIGH AUTOMATION | THE SYSTEM PERFORMS ALL DRIVING FUNCTIONS IN STATE THAT DRIVER GETS ON IN EXTREMELY EXCEPTIONAL SITUATION. | THE DRIVER IS SELECTIVELY ABLE TO COPE WITH AN EMERGENCY SITUATION WHEN THE SYSTEM IN LEVEL 4 REQUESTS TRANSFERRING THE CONTROL RIGHT |
| LEVEL 5 | FULL AUTOMATION | THE SYSTEM PERFORMS FULL DRIVING FUNCTIONS TO COPE WITH ALL SITUATIONS WITHOUT A DRIVER | THE DRIVER DOES NOT PERFORM DRIVING FUNCTIONS OTHER THAN DETERMINING THE OPERATING STATE OF SYSTEM. |

FIG. 1

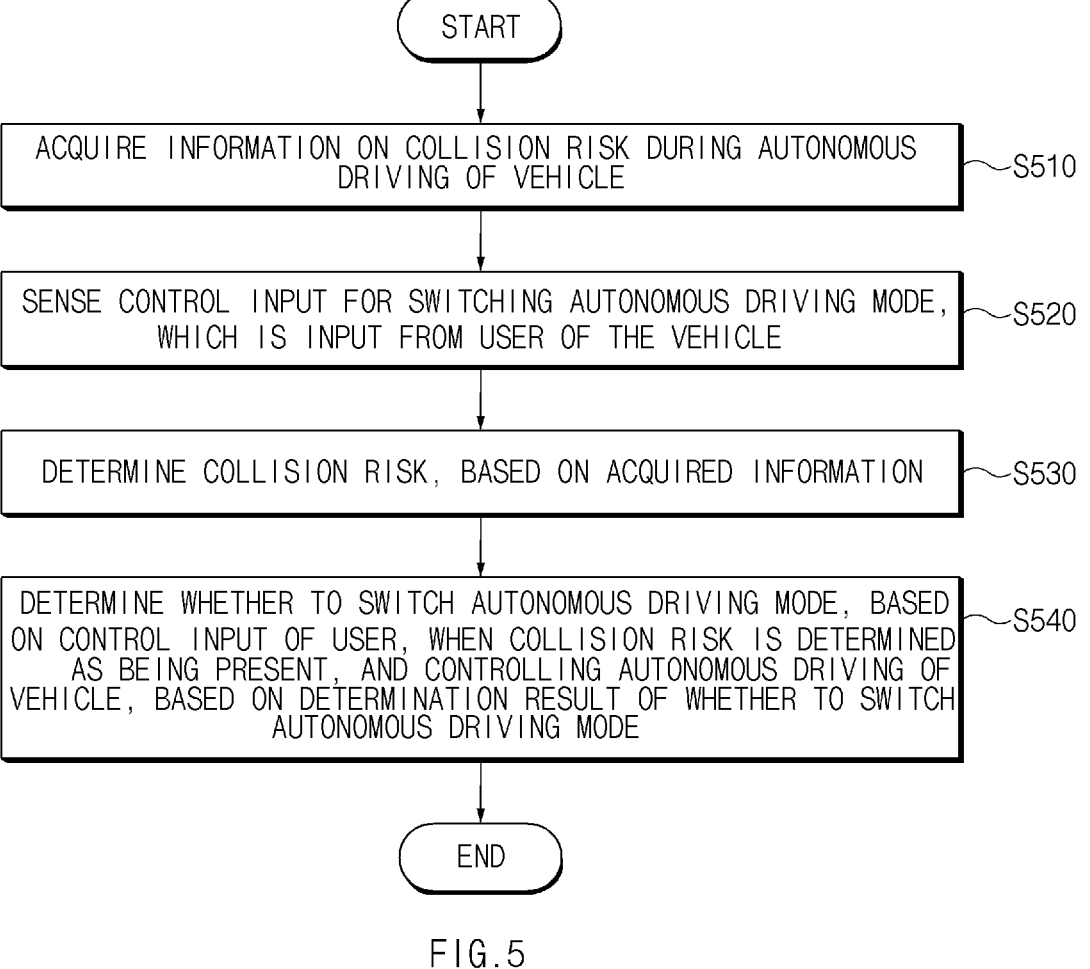

```
                          ┌─────────────┐
                          │    START    │
                          └──────┬──────┘
                                 │
                                 ▼
  ┌─────────────────────────────────────────────────────────────┐
  │  ACQUIRE INFORMATION ON COLLISION RISK DURING AUTONOMOUS     │──S510
  │                 DRIVING OF VEHICLE                           │
  └──────────────────────────────┬──────────────────────────────┘
                                 │
                                 ▼
  ┌─────────────────────────────────────────────────────────────┐
  │  SENSE CONTROL INPUT FOR SWITCHING AUTONOMOUS DRIVING MODE,  │──S520
  │         WHICH IS INPUT FROM USER OF THE VEHICLE             │
  └──────────────────────────────┬──────────────────────────────┘
                                 │
                                 ▼
  ┌─────────────────────────────────────────────────────────────┐
  │   DETERMINE COLLISION RISK, BASED ON ACQUIRED INFORMATION    │──S530
  └──────────────────────────────┬──────────────────────────────┘
                                 │
                                 ▼
  ┌─────────────────────────────────────────────────────────────┐
  │  DETERMINE WHETHER TO SWITCH AUTONOMOUS DRIVING MODE, BASED  │──S540
  │  ON CONTROL INPUT OF USER, WHEN COLLISION RISK IS DETERMINED │
  │    AS BEING PRESENT, AND CONTROLLING AUTONOMOUS DRIVING OF   │
  │  VEHICLE, BASED ON DETERMINATION RESULT OF WHETHER TO SWITCH │
  │                 AUTONOMOUS DRIVING MODE                      │
  └──────────────────────────────┬──────────────────────────────┘
                                 │
                                 ▼
                          ┌─────────────┐
                          │     END     │
                          └─────────────┘
```

FIG.5

APPARATUS FOR CONTROLLING AUTONOMOUS DRIVING AND METHOD FOR THE SAME

CROSS-REFERENCE TO RELATED APPLICATION

This application claims the benefit of priority to Korean Patent Application No. 10-2022-0173892, filed in the Korean Intellectual Property Office on Dec. 13, 2022, the entire contents of which are incorporated herein by reference.

TECHNICAL FIELD

The present disclosure relates to an apparatus for controlling autonomous driving and a method for the same, and more particularly to an apparatus for controlling autonomous driving in a collision-situation during the autonomous driving, and a method for the same.

BACKGROUND

An autonomous driving vehicle may require an ability to adaptively cope with a surrounding situation changing in real time during driving. To mass-produce and activate an autonomous driving vehicle, a reliable determination control function would be crucial. Recently, a semi-autonomous vehicle launched in a market performs driving, braking, and steering in place of a driver to reduce the fatigue of a driver. For the semi-autonomous vehicle, the driver should pay attention to driving while holding a steering wheel, which is less desirable than a full autonomous driving vehicle. The semi-autonomous vehicle may provide functions, such as Highway Driving Assist (HDA), Driver Status Warning (DSW) that outputs a warning alarm through a cluster by determining driver carelessness and condition abnormalities such as drowsy driving, or gaze loss, Driver Awareness Warning (DAW) to determine whether a vehicle is traveling in an unstable manner across lanes through a front camera, Forward Collision-Avoidance Assist (FCA) or Active Emergency Brake System (AEBS) to perform rapid braking upon sensing a forward collision.

Autonomous driving may be activated through the handling of a driver under a limited condition allowing the activation, and may allow an autonomous driving system to transfer the right of control to the driver or to perform risk-minimizing driving, such as stopping in a lane or changing lanes, under a condition of limiting the autonomous driving system. For example, when the risk of collision is imminent during autonomous driving, the autonomous driving system may perform emergency avoidance control and emergency braking control. Meanwhile, the autonomous driving may be completely terminated or the mode of the autonomous driving may be switched to a manual mode, when a user presses a button for ending the autonomous driving, which may be provided in an autonomous driving vehicle, during the autonomous driving, operates a steering wheel, or presses an acceleration/deceleration pedal. If the manual mode is performed by the user, during the emergency avoidance control and the emergency braking control, a risky event (e.g., an accident) may occur. Accordingly, a technology to address the above problem needs to be developed.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure provides an apparatus for controlling autonomous driving under a collision risk situation during the autonomous driving, and a method for the same.

Another aspect of the present disclosure provides an apparatus for controlling autonomous driving, capable of improving the safety of an autonomous driving system under a collision risk situation, and a method for the same.

Another aspect of the present disclosure provides an apparatus for controlling autonomous driving, capable of preventing a large risk caused when a user unintentionally makes a control input due to great kinetic energy resulting from emergency avoidance control and emergency braking control, and a method for the same.

Another aspect of the present disclosure provides an apparatus for controlling autonomous driving, capable of switching to a manual mode only when safety is determined under a collision risk situation, even if a user intentionally switch to the manual mode during emergency avoidance control and emergency braking control, and a method for the same.

Another aspect of the present disclosure provides an apparatus for controlling autonomous driving, capable of reflecting both the safety of autonomous driving and the intent of a user, by reflecting only a portion of a control input of the user in controlling a vehicle, while considering a collision risk situation during autonomous driving, and a method for the same.

The technical problems to be solved by the present disclosure are not limited to the aforementioned problems, and any other technical problems not mentioned herein will be clearly understood from the following description by those skilled in the art to which the present disclosure pertains.

An apparatus may comprise: a sensor device, of a vehicle, to acquire information associated with at least one collision risk during an autonomous driving of the vehicle; a user input sensing device configured to sense, from a user of the vehicle, a control input associated with switching of an autonomous driving mode; a processor configured to: determine, based on the information acquired through the sensor device, a collision risk of the at least one collision risk; determine whether to switch, from the autonomous driving mode to a manual mode, based on the control input and the determined collision risk; and control, based on a determination whether to switch from the autonomous driving mode to the manual mode, the autonomous driving of the vehicle.

The sensor device may be configured to acquire information indicating at least one of: a surrounding object of the vehicle, a speed of the vehicle, an acceleration of the vehicle, or a distance to the surrounding object.

The user input sensing device may be configured to sense at least one of: an input for terminating the autonomous driving, an input for steering, an input for acceleration, or an input for deceleration.

The processor may be further configured to: perform, through a control of the autonomous driving of the vehicle and based on the collision risk, at least one of: an emergency avoidance control or an emergency braking control; and maintain the autonomous driving mode based on at least one of: the emergency avoidance control or the emergency braking control, wherein a control input indicating a switch to the manual mode is sensed during the emergency avoidance control or the emergency braking control.

The processor may be further configured to: after temporarily maintaining the autonomous driving mode based on the emergency avoidance control or the emergency braking control, switch to the manual mode, based on the collision risk being removed or the vehicle being stopped.

The processor may be further configured to: switch to the manual mode, after a specific time is elapsed, based on: the emergency avoidance control or the emergency braking control being maintained; and the collision risk being removed or the vehicle being stopped.

The processor may be further configured to: perform, through a control of the autonomous driving and based on the collision risk, an emergency avoidance control or an emergency braking control; and maintain, based on a sensed input for steering, the autonomous driving mode based on at least one of: the emergency avoidance control or the emergency braking control, wherein a control amount of the sensed input for steering exceeds a preset threshold value.

The processor may be further configured to: determine, based on a sensed input for steering, whether the collision risk is associated with a steering direction of the sensed input for steering, wherein a control amount of the sensed input for steering does not exceed a preset threshold value; and maintain the autonomous driving mode based on an emergency avoidance control or an emergency braking control, wherein the autonomous driving mode based on the emergency avoidance control or the emergency braking control is maintained based on an adjustment of the sensed input for steering and based on the collision risk not being associated with the steering direction.

The processor may be further configured to: perform, through a control of the autonomous driving and based on the collision risk, an emergency avoidance control or an emergency braking control; and maintain the autonomous driving mode based on the emergency avoidance control or the emergency braking control, wherein the autonomous driving mode based on the emergency avoidance control or the emergency braking control is maintained based on an adjustment of a sensed input for deceleration and based on a control amount of the sensed input for deceleration exceeding a deceleration control amount.

The processor may be further configured to: determine whether the user holds a steering wheel, based on: the collision risk; a sensed input for acceleration or a sensed input for deceleration; and a control amount of the sensed input for acceleration or the sensed input for deceleration not exceeding a preset threshold value; determine whether the collision risk is associated with a steering direction of the steering wheel, when the user holds the steering wheel; and switch the autonomous driving mode to the manual mode, based on the collision risk not being associated with the steering direction.

The apparatus may further comprise a display device configured to display information indicating a switching from the autonomous driving mode to the manual mode.

A method may comprise: acquiring, by a sensor device of a vehicle, information associated with at least one collision risk during an autonomous driving of the vehicle; sensing, by a user input sensing device and from a user of the vehicle, a control input associated with switching of an autonomous driving mode; determining, by a processor and based on the information acquired through the sensor device, a collision risk of the at least one collision risk; determining, by the processor, whether to switch, from the autonomous driving mode to a manual mode, based on the control input and the determined collision risk; and controlling, by the processor and based on a determination whether to switch from the autonomous driving mode to the manual mode, the autonomous driving of the vehicle.

The sensing of the control input may comprise: sensing, by the user input sensing device, at least one of: an input for terminating the autonomous driving, an input for steering, an input for acceleration, or an input for deceleration.

The method may further comprise: performing, through a control of the autonomous driving of the vehicle and based on the collision risk, at least one of: an emergency avoidance control or an emergency braking control. The controlling the autonomous driving of the vehicle may comprise: maintaining, by the processor, the autonomous driving mode based on at least one of: the emergency avoidance control or the emergency braking control, wherein a control input indicating a switch to the manual mode is sensed during the emergency avoidance control or the emergency braking control.

The determining whether to switch from the autonomous driving mode to the manual mode may comprise: after temporarily maintaining the autonomous driving mode based on the emergency avoidance control or the emergency braking control, switching, by the processor, to the manual mode, based on the collision risk being removed or the vehicle being stopped.

The determining whether to switch from the autonomous driving mode to the manual mode may comprise: switching, by the processor, to the manual mode after a specific time is elapsed, based on: the emergency avoidance control or the emergency braking control being maintained; and the collision risk being removed or the vehicle being stopped.

The method may further comprise: performing, through a control of the autonomous driving and based on the collision risk, and emergency avoidance control or an emergency braking control. The controlling the autonomous driving of the vehicle may comprise: maintaining, by the processor and based on a sensed input for steering, the autonomous driving mode based on at least one of: the emergency avoidance control or the emergency braking control, wherein a control amount of the sensed input for steering exceeds a preset threshold value.

The determining whether to switch from the autonomous driving mode to the manual mode the collision risk may comprise: determining, by the processor and based on a sensed input for steering, whether the collision risk is associated with a steering direction of the sensed input for steering, wherein a control amount of the sensed input for steering does not exceed a preset threshold value. The controlling the autonomous driving of the vehicle may comprise: maintaining, by the processor, the autonomous driving mode based on an emergency avoidance control or an emergency braking control, wherein the autonomous driving mode based on the emergency avoidance control or the emergency braking control is maintained based on an adjustment of the sensed input for steering and based on the collision risk not being associated with the steering direction.

The method may further comprise: performing, through a control of the autonomous driving and based on the collision risk, an emergency avoidance control or an emergency braking control. The controlling the autonomous driving of the vehicle may comprise: maintaining, by the processor, the autonomous driving mode based on the emergency avoidance control or the emergency braking control, wherein the autonomous driving mode based on the emergency avoidance control or the emergency braking control is maintained based on an adjustment of a sensed input for deceleration and based on a control amount of the sensed input for deceleration exceeding a deceleration control amount.

The determining whether to switch from the autonomous driving mode to the manual mode may comprise: determining, by the processor, whether the user holds a steering wheel, based on: the collision risk; a sensed input for acceleration or a sensed input for deceleration; and a control amount of the sensed input for acceleration or the sensed input for deceleration not exceeding a preset threshold value; determining, by the processor, whether the collision risk is associated with a steering direction of the steering wheel, when the user holds the steering wheel; and switching, by the processor, the autonomous driving mode to the manual mode, based on the collision risk not being associated with the steering direction.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 1 is a table having defined autonomous levels of an autonomous driving vehicle;

FIG. 5 is a flowchart illustrating a method for controlling autonomous driving.

DETAILED DESCRIPTION

Figure 2:
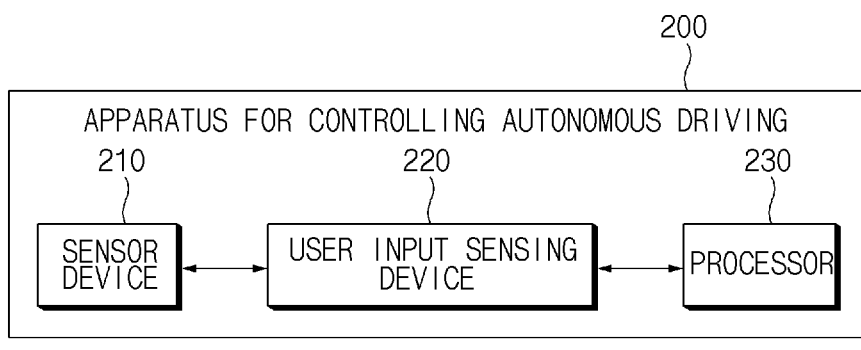
FIG. 2 is a block diagram illustrating an apparatus for controlling autonomous driving.

Hereinafter, various examples of the present disclosure will be described in detail with reference to accompanying drawings. In adding the reference numerals to the components of each drawing, it should be noted that the identical or equivalent component is designated by the identical numeral even when they are displayed on other drawings. In addition, a detailed description of well-known features or functions may be concisely described or the description thereof may be omitted in order not to unnecessarily obscure the gist of the present disclosure.

In describing elements of examples of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of this disclosure and the relevant art and will not be interpreted in an idealized or overly formal sense unless expressly so defined herein.

Hereinafter, various examples of the present disclosure will be described with reference to FIGS. 1 to 6.

FIG. 1 is a table having defined autonomous levels of an autonomous driving vehicle.

An autonomous driving vehicle may include a vehicle that recognizes a driving condition to determine a dangerous situation, controls a driving route, and/or minimizes operations for the driving by a driver, such that a vehicle performs self-driving.

The autonomous driving vehicle may include a vehicle that is able to drive, control, and park without a driving control of a person, and a vehicle having the highest level of autonomous driving technology (that is, an ability to operate the vehicle without active control or monitoring by a driver).

Referring to FIG. 1, in level 0 to level 2 of autonomous driving, a driving environment may need to be monitored by the driver. In level 3 to level 5 of autonomous driving, the driving environment may be monitored by an automated driving system.

However, the present concept of the autonomous driving vehicle may include an automation level (autonomous driving level) in the intermediate level, as illustrated in FIG. 1, aiming at a full automation vehicle, and may correspond to a target-oriented concept for mass-production and commercialization of a full autonomous vehicle.

According to the present disclosure, an apparatus for controlling autonomous driving and a method for the same may be applicable to the autonomous driving vehicle corresponding to level 3 (conditional automation) among automation levels illustrated in FIG. 1, but aspects are not limited thereto. For example, the apparatus for controlling the autonomous driving and the method for the same may be applicable to an autonomous driving vehicle to support a plurality of various automation levels.

The automation level of the autonomous driving vehicle based on the American Society of Automotive Engineers (SAE) is classified as illustrated in a table of FIG. 1.

FIG. 2 is a block diagram illustrating an apparatus for controlling the autonomous driving.

According to the present disclosure, an apparatus 200 (e.g., an apparatus for controlling autonomous driving) may be implemented inside or outside a vehicle. In this case, the apparatus 200 may be implemented integrally with internal control units of the vehicle. Alternatively or additionally, the apparatus 200 may be implemented with a separate hardware device and may be connected with the internal control units of the vehicle through a connection unit.

For example, the apparatus 200 may be implemented integrally with the vehicle, and other components of the apparatus 200 may be implemented in the form of mounted/attached onto the vehicle, in a configuration separate from that of the vehicle.

Referring to FIG. 2, the apparatus 200 may include a sensor device 210, a user input sensing device 220, and a processor 230.

The sensor device 210 may be provided in the vehicle to acquire information on a collision risk during autonomous driving of the vehicle.

For example, the sensor device 210 may acquire information on at least one of: a surrounding object of the vehicle, a speed of the vehicle, an acceleration of the vehicle, and/or a distance to the surrounding object.

For example, the sensor device 210 may include at least one of a camera, a light detection and ranging (LiDAR), and/or a radar to acquire information on the surrounding of the vehicle. The sensor device 210 may acquire the position of the surrounding object of the vehicle and/or the distance between the surrounding object and the vehicle, through at least one of the camera, the LiDAR, and/or the radar.

For example, the sensor device 210 may include at least one of: a speed sensor to sense the speed of the vehicle and/or an acceleration sensor to sense the acceleration of the vehicle.

In an example, the sensor device 210 may acquire information on the speed of the vehicle and/or the acceleration of the vehicle by receiving the information on the speed of the vehicle and/or the acceleration of the vehicle from another controller of the vehicle.

For example, the sensor device 210 may be directly and/or indirectly connected to the processor 230 in a wireless and/or wired manner to transmit the acquired information on the collision risk to the processor 230.

The user input sensing device 220 may sense a control input for switching an autonomous driving mode, which may be input from a user, of the vehicle.

For example, the user input sensing device 220 may sense at least one of: an input (e.g., an autonomous driving ending input) for ending autonomous driving, an input (e.g., a steering input) for steering, an input (e.g., an acceleration input) for acceleration, or an input (e.g., a deceleration input) for deceleration.

For example, the user input sensing device 220 may be directly and/or indirectly connected to a button to end (e.g., terminate) the autonomous driving, which may be provided (e.g., in the vehicle), to receive information on the input of the button to end the autonomous driving.

For example, the user input sensing device 220 may be directly and/or indirectly connected to a steering wheel and/or a steering system provided in the vehicle to receive information on the input for the steering from the steering wheel and/or a steering system.

For example, the user input sensing device 220 may be directly and/or indirectly connected to an accelerator pedal, which may be provided in the vehicle, to receive information on the input of the acceleration pedal.

For example, the user input sensing device 220 may be directly and/or indirectly connected to a deceleration pedal, which may be provided in the vehicle, to receive information on the input of the deceleration pedal.

For example, the user input sensing device 220 may be directly and/or indirectly connected to the processor 230 through wireless communication and/or wired communication to transmit information on a control input of the user for switching the mode of the autonomous driving, to the processor 230.

The processor 230 may be executed using at least instruction stored in the memory, and may perform the whole (or at least partial) control such that the components normally perform the intrinsic functions of the components. The processor 230 may be implemented in the form of hardware or software, and may be implemented in the form of the combination of the hardware and the software. The processor 230 may be implemented in the form of a microprocessor, but aspects of the present disclosure are not limited thereto. The processor 230 may perform various data processes and computations to be described below.

The apparatus 200 may include a memory to store data and/or an algorithm that may be necessary during data processing and/or computing, and/or to store instructions based on the execution of the processor 230.

For example, the memory, which may be included in the apparatus 200, may include at least one storage medium of a memory in a flash memory type, a hard disk type, a micro type, the type of a card (e.g., a Security Digital (SD) card or an extreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

The processor 230 may an electrical circuit to execute the instruction of software. For example, the processor 230 may include an electronic control unit (ECU), a micro-controller unit (MCU), and/or another lower level controller.

The processor 230 may determine a collision risk based on information acquired through the sensor device 210, may determine whether to switch the mode of the autonomous driving, based on a control input of the user, when the collision risk is determined, and may control the autonomous driving of the vehicle, based on the result of the determination of whether to switch the mode.

In an example, when the distance to the surrounding object, which may be acquired through the sensor device 210, is less than a preset threshold value, the processor 230 may determine that the collision risk is present.

In an example, the processor 230 may determine whether there is a collision risk by further considering the speed of the vehicle and/or the acceleration of the vehicle, with the distance to the surrounding object.

The following description will be made regarding that the processor 230 controls the autonomous driving depending on the control input of the user.

For example, if the collision risk is determined as being present, the processor 230 may perform an emergency avoidance control or an emergency braking control through the autonomous driving.

In this case, the emergency avoidance control or the emergency braking control through the autonomous driving may include an avoidance control or braking control included in Minimum Risk maneuver (MRM) of the autonomous driving.

In at least some autonomous driving system, when the at least one of the input for ending the autonomous driving, the input for steering, the input for acceleration, or the input for deceleration may be input or when at least one of the input for steering, the input for acceleration, or the input for deceleration is input, the autonomous driving mode may be ended, and switched to the manual mode.

For example, the processor 230 may maintain the autonomous driving mode based on the emergency avoidance control and/or the emergency braking control even if the control input of the user to switch to the manual mode is sensed during the emergency avoidance control and/or the emergency braking control.

In this case, the control input of the user to switch to the manual mode may include at least one of: the input for ending the autonomous driving, the input for steering, the input for acceleration, or the input for deceleration and/or at least one of: the input for steering, the input for acceleration, or the input for deceleration, which may be equal to or greater than a preset threshold value.

The manual mode of the autonomous driving may include a mode in which the right of control (driving or steering) over the vehicle is transferred to the user. The autonomous driving mode different from the manual mode may include a mode in which the right of the control over the vehicle is transferred to the autonomous driving system.

Even if the control input of the user to switch the manual mode is sensed during the emergency avoidance control and/or the emergency braking control, the autonomous driving vehicle may not be immediately switched from the autonomous driving mode to the manual mode. The rest of the emergency avoidance control and/or the emergency braking control has been finished, such that the safety of the vehicle is ensured.

For example, if the collision risk is removed or the vehicle is stopped, after the autonomous driving mode based on the emergency avoidance control or the emergency braking control is maintained, the processor 230 may switch from the autonomous driving mode to the manual mode immediately or when a preset specific time is elapsed.

The processor 230 may maintain the autonomous driving mode and may continuously determine the collision risk in real time. If the collision risk is removed, the processor 230 may switch from the autonomous driving mode to the manual mode by determining that it is no longer dangerous to switch the autonomous driving mode to the manual mode.

The processor 230 may sense that the vehicle is stopped through the speed sensor of the vehicle after the autonomous driving mode is maintained. When the vehicle is stopped, the processor 230 may switch from the autonomous driving mode to the manual mode by determining that it is no longer dangerous to switch the autonomous driving mode to the manual mode.

The processor 230 may switch the autonomous driving mode to the manual mode when the specific time is elapsed after the collision risk is removed or the vehicle is stopped, thereby additionally determining the safety state of the vehicle until the specific time is elapsed. Accordingly, the safety of the vehicle may be further improved.

For example, the processor 230 may employ an autonomous driving control strategy varied depending on whether an input control amount exceeds a preset threshold value, when the steering input is sensed.

For example, the processor 230 may maintain the autonomous driving mode based on the emergency avoidance control and/or the emergency braking control, when the steering input is sensed and when the control amount of the steering input exceeds the preset threshold value.

If the control amount of the steering input exceeds the preset threshold value, the reliability for the control input may be determined as being lower (e.g., lower than a reliability threshold). In this case, the processor 230 may maintain the autonomous driving mode based on the emergency avoidance control and/or the emergency braking control without switching the autonomous driving mode to the manual mode.

For example, when the steering input is sensed and when the control amount of the steering input does not exceed the preset threshold value, the processor 230 may determine whether the collision risk is present in a steering direction of the steering input. In this case, when the collision risk is not determined as being present in the steering direction, the processor 230 may maintain the autonomous driving mode based on the emergency avoidance control or emergency braking control while reflecting the steering input.

When the control amount of the steering input does not exceed the preset threshold value, the reliability for control input may not be determined as being lower (e.g., not lower than the reliability threshold). Accordingly, in this case, the processor 230 individually determine may the collision risk in the steering direction. If the collision risk is not determined as being present in the steering direction, the processor 230 may maintain the autonomous driving mode based on the emergency avoidance control and/or the emergency braking control while reflecting the steering input of the user, thereby performing the steering control of the vehicle.

In this case, the processor 230 may perform the steering control by the vehicle, by totally or partially the steering input of the user.

Even if the control amount of the steering input does not exceed the preset threshold value, when the collision risk is determined as being present in the steering direction, the processor 230 may not reflect the steering input of the user.

In this case, in the process of determining the collision risk in the steering direction of the steering input, the processor 230 may consider at least one of: a current speed or a current acceleration of the vehicle, and/or the distance to a surrounding object on a driving path in the steering direction For example, the processor 230 may maintain the autonomous driving mode based on the emergency avoidance control and/or the emergency braking control while reflecting the deceleration input, when the deceleration input is sensed and when the control amount of the deceleration input exceeds a deceleration control amount based on the emergency avoidance control and/or the emergency braking control.

When the deceleration control amount input from the user exceeds a deceleration control amount calculated through the autonomous driving system, the reliability for control input of the user may not be determined as being lower or the control based on the control input of the user may be safer than the control by the system. Accordingly, in this case, the processor 230 may maintain the autonomous driving mode based on avoidance control or the emergency braking the emergency control while reflecting the deceleration input, thereby performing the deceleration control of the vehicle, based on the deceleration control amount of the user.

In this case, the processor 230 may perform the deceleration control by the vehicle, by totally or partially the deceleration input of the user.

For example, when the collision risk is determined, when the acceleration input or the deceleration input is sensed, and when the control amount of the acceleration input or the deceleration input does not exceed a preset threshold value, the processor 230 may determine whether the user holds the steering wheel. When the user holds the steering wheel, the processor 230 may determine the collision risk in the steering direction of the steering wheel. When the collision risk is not determined as being present in the steering direction, the processor 230 may switch the autonomous driving mode to the manual mode.

When the control amount of the acceleration input or the deceleration input does not exceed a preset threshold value, the reliability for the control input of the user may not be determined as being lower (e.g., lower than the reliability threshold). In this case, the processor 230 may (e.g., additionally) determine whether the user holds the steering wheel and determine the collision risk in the steering direction of the steering wheel. At the final stage, the processor 230 may determine whether to switch the autonomous driving mode to the manual mode, based on the determination result.

In this case, in the process of individually determining the collision risk in the steering direction of the steering input, the processor 230 may consider at least one of: a current speed or a current acceleration of the vehicle, and/or the distance to a surrounding object on a driving path in the steering direction or an acceleration/deceleration control amount which is input.

Although not illustrated, for example, the apparatus 200 may include a display device to display information on switching the autonomous driving mode.

The display device may visually output information on switching the mode in the autonomous driving to provide the information on the switching the mode in the autonomous driving by the user.

For example, the display device may include at least one of: an audio video navigation (AVN), a cluster, and/or a head-up display provided in the vehicle.

Figure 3:
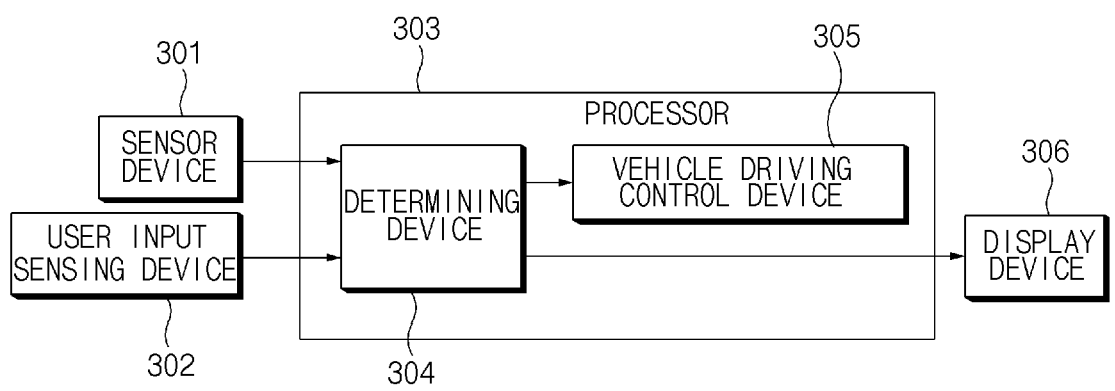
FIG. 3 is a view illustrating the detailed configuration of an apparatus for controlling autonomous driving.

FIG. 3 is a view illustrating the detailed configuration of the apparatus 200 for controlling the autonomous driving.

Referring to FIG. 3, in the apparatus 200, the processor 330 may include a determining device 304 and a vehicle driving control device 305.

The determining device 304 may include at least one processor to perform data processing and/or computation to determine a collision risk and the autonomous driving control based on the autonomous driving strategy in the state of the collision risk.

The determining device 304 may include a memory to store data and/or algorithm that may be necessary in the procedure of performing the data processing and/or computation by the at least one processor.

The determining device 304 may receive, from the sensor device 301, information on the collision risk collected during the autonomous driving. The information on the collision risk may include at least one of: information indicating a surrounding object of the vehicle, information indicating a speed of the vehicle, and/or information indicating the acceleration of the vehicle.

The determining device 304 may receive information indicating a control input for releasing the autonomous driving mode of the vehicle, for example, from the user input sensing device 302. The control input for releasing the autonomous driving mode may include at least one of: the autonomous driving ending input or the steering input, the acceleration input, and/or the deceleration input exceeding the preset threshold value.

The determining device 304 may determine the collision risk of the vehicle, based on the information indicating the collision risk, which is received.

If the collision risk is determined as being present, the determining device 304 may perform an emergency avoidance control and/or an emergency braking control, without releasing the autonomous driving mode of the vehicle, even if the control input for releasing the autonomous driving mode is made.

The determining device 304 may perform a driving control, a braking control, and/or a steering control, for example, based on the emergency avoidance control and/or the emergency braking control, through the vehicle driving control device 305 to control the driving, the braking, and the steering of the vehicle.

The determining device 304 may output (e.g., display), through the display device 306, whether the autonomous driving mode of the vehicle is switched to the manual mode, whether the emergency avoidance control and/or the emergency braking control of the vehicle is performed, whether the autonomous driving mode of the vehicle is maintained, and/or whether the autonomous driving mode of the vehicle is maintained while totally or partially reflecting the control input of the user.

Figure 4A:
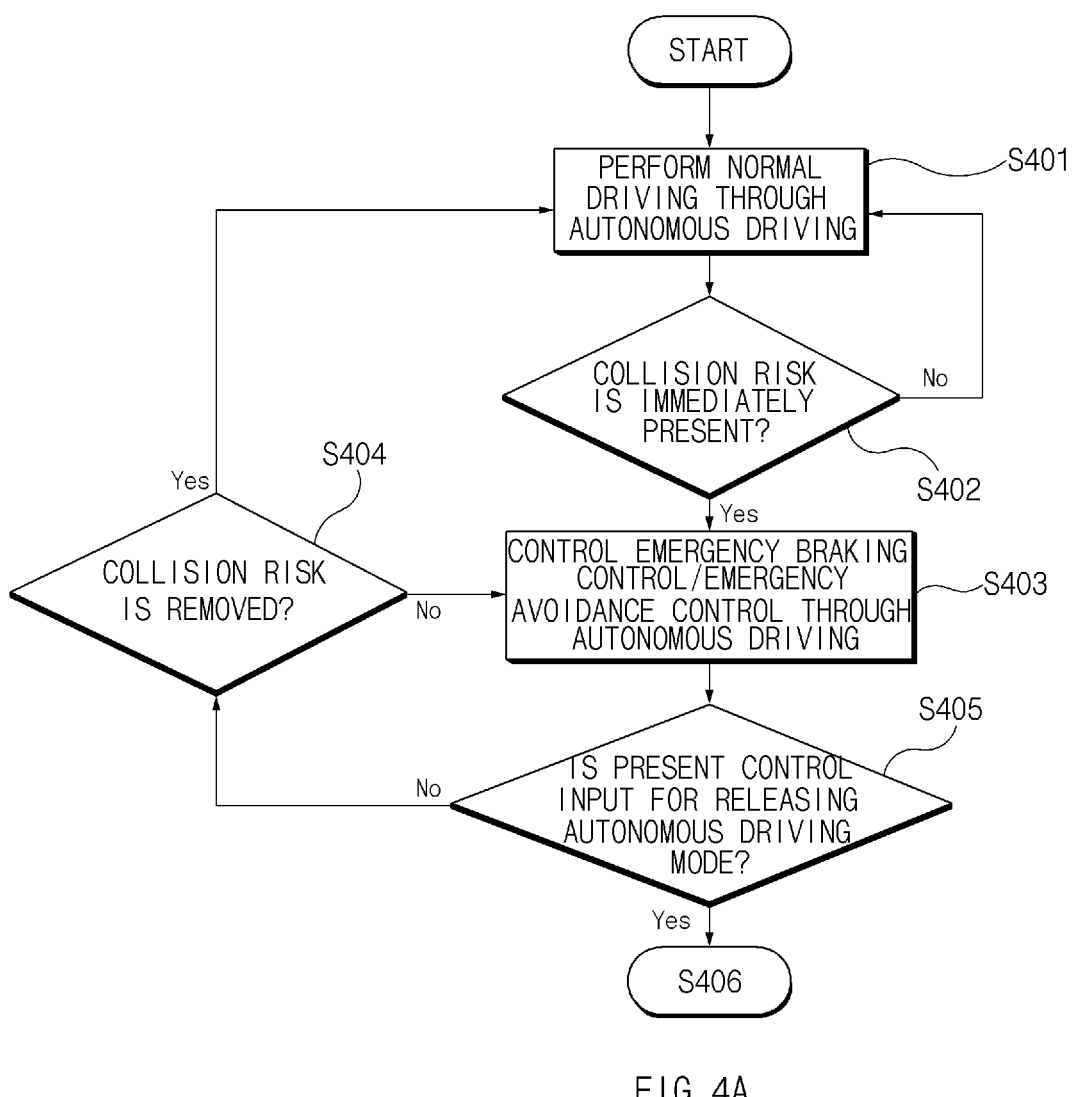
FIGS. 4A and 4B are flowcharts illustrating the operation of an apparatus for controlling the autonomous driving.
Figure 4B:
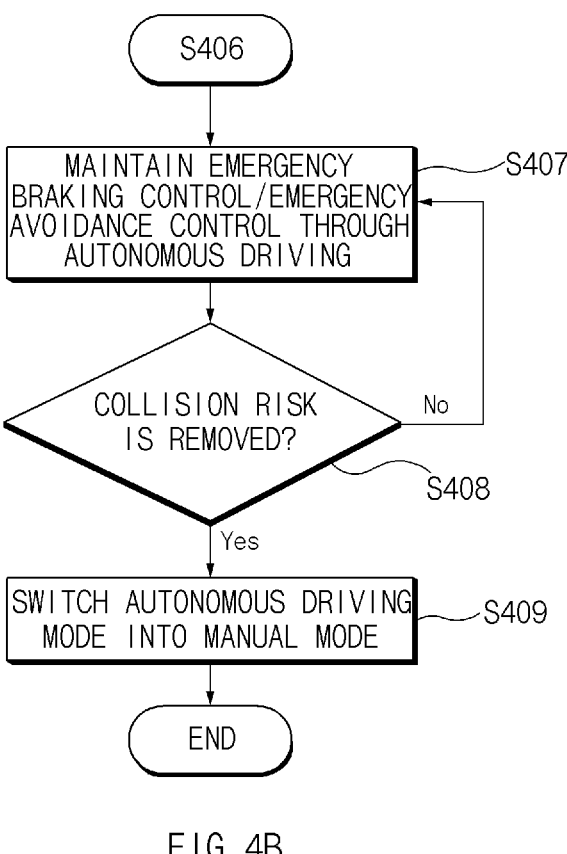

FIGS. 4A and 4B are flowcharts illustrating the operation of the apparatus controlling the autonomous driving.

Referring to FIG. 4A, the apparatus for controlling the autonomous driving may perform a normal driving through autonomous driving (S401). In this case, the normal driving may refer to driving when a collision risk is not sensed.

The apparatus for controlling the autonomous driving may determine whether the collision risk is (e.g., immediately) present (S402).

For example, the apparatus for controlling the autonomous driving may determine whether a collision risk with another vehicle, a pedestrian, and/or another object is present within a preset short period of time, based on information indicating the surrounding and the speed/acceleration of the vehicle, which may be acquired through the sensor.

The apparatus for controlling the autonomous driving may perform the normal driving through the autonomous driving by returning to S401, if it is determined that the collision risk does not (e.g., immediately) exist.

The apparatus for controlling the autonomous driving may perform an emergency braking control and/or an emergency avoidance control through the autonomous driving, if it is determined that the collision risk (e.g., immediately) exists (S403).

For example, the apparatus for controlling the autonomous driving may prevent an accident through a sudden braking through the autonomous driving, and/or may avoid the collision with an object through the steering control through the autonomous driving.

The apparatus for controlling the autonomous driving may determine whether the control input for releasing the autonomous driving mode is present (S405).

For example, the apparatus for controlling the autonomous driving may determine whether an autonomous driving releasing input for releasing the autonomous driving mode, or a steering control input, an acceleration control input, and/or a deceleration control input to exceed a threshold value is present.

The apparatus for controlling the autonomous driving may determine whether the collision risk is removed, if the control input for releasing the autonomous driving mode is absent (S404).

For example, the apparatus for controlling the autonomous driving may determine whether the collision risk is removed by re-determining the collision risk if the control input for releasing the autonomous driving mode is absent.

The apparatus for controlling the autonomous driving may perform the normal driving through the autonomous driving by returning to S401, for example, if the collision risk is removed.

The apparatus for controlling the autonomous driving may perform the emergency braking control and/or the emergency avoidance control through the autonomous driving by returning to S403 (e.g., when the collision risk is not removed).

For example, the apparatus for controlling the autonomous driving may perform the emergency braking control and/or the emergency avoidance control through Minimum Risk maneuver (MRM).

The apparatus for controlling the autonomous driving may perform operations subsequent to S406 (e.g., when the control input for releasing the autonomous driving mode is present).

The operations subsequent to S406 will be described below with reference to FIG. 4B.

Referring to FIG. 4B, the apparatus for controlling the autonomous driving may maintain the emergency braking control and/or the emergency avoidance control through the autonomous driving (S407).

For example, if the control input for releasing the autonomous driving mode is present in S405, the apparatus for controlling the autonomous driving may maintain the emergency braking control and/or the emergency avoidance control without switching the autonomous driving mode to the manual mode.

The apparatus for controlling the autonomous driving may determine whether the collision risk is removed (S408).

The apparatus for controlling the autonomous driving may perform the emergency braking control and/or the emergency avoidance control through the autonomous driving by returning to S407 (e.g., when the collision risk is not removed).

The apparatus for controlling the autonomous driving may switch the autonomous driving mode into the manual mode (e.g., when the collision risk is removed) (S409).

FIG. 5 is a flowchart illustrating a method for controlling autonomous driving.

Referring to FIG. 5, the method for controlling the autonomous driving may include acquiring information on collision risk during autonomous driving of the vehicle (S510), sensing a control input for switching an autonomous driving mode, which may be input from a user of the vehicle (S520), determining the collision risk, based on the acquired information (S530), and determining whether to switch the autonomous driving mode, based on the control input of the user, when the collision risk is determined as being present, and controlling the autonomous driving, based on the determination result of whether to switch the autonomous driving mode (S540).

The acquiring information on collision risk during the autonomous driving of the vehicle (S510) may be performed by the sensor device provided in the vehicle.

For example, the acquiring information on collision risk during the autonomous driving of the vehicle (S510) may include acquiring, by the sensor device, information on at least one of: a surrounding object of the vehicle, the speed of the vehicle, the acceleration of the vehicle, and/or the distance to the surrounding object.

The sensing of the control input for switching the autonomous driving mode, which may be input from the user of the vehicle (S520), may be performed by the user input sensing device.

For example, the sensing of the control input for switching the autonomous driving mode, which may be input from the user of the vehicle (S520), may include sensing, by the user input sensing device, at least one of: the autonomous driving ending input, the steering input, the acceleration input, and/or the deceleration input.

The determining of the collision risk, based on the acquired information, (S530) may be performed by the processor.

The determining of whether to switch the autonomous driving mode, based on the control input of the user, when the collision risk is determined as being present, and the controlling of autonomous based the driving, on the determination result of whether to switch the autonomous driving mode of the vehicle (S540) may be performed by the processor.

Although not illustrated, for example, the method for controlling the autonomous driving may further include performing, by the processor, the emergency avoidance control and/or the emergency braking control through the autonomous driving (e.g., when the collision risk is determined).

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include maintaining, by the processor, the autonomous driving mode based on the emergency avoidance control and/or the emergency braking control even if the control input of the user to switch to the manual mode is sensed during the emergency avoidance control and/or the emergency braking control.

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include maintaining, by the processor, the autonomous driving mode based on the emergency avoidance control and/or the emergency braking control, and switching to the manual mode, when the collision risk is removed or the vehicle is stopped.

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include maintaining, by the processor, the autonomous driving mode based on the emergency avoidance control and/or the emergency braking control, and switching to the manual mode, after a specific time is elapsed, when the collision risk is removed or the vehicle is stopped.

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include maintaining, by the processor, the autonomous driving mode based on the emergency avoidance control and/or the emergency braking control, when the steering input is sensed and the control amount of the steering input exceeds the preset threshold value.

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include determining the collision risk in the steering direction of the steering input, when the steering input is sensed and the control amount of the steering input does not exceed the preset threshold value, and maintaining, by the processor, the autonomous driving mode based on the emergency avoidance control and/or the emergency braking control while reflecting the steering input, when the collision risk is not determined as being present in the steering direction.

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include maintaining, by the processor, the autonomous driving mode based on the emergency avoidance control and/or the emergency braking control while reflecting the deceleration input, when the deceleration input is sensed and the control amount of the deceleration input exceeds a deceleration control amount based on the emergency avoidance control and/or the emergency braking control.

For example, the determining of whether to switch the autonomous driving mode, based on the control input of the user, when the collision risk is determined as being present, and the controlling of the autonomous driving of the vehicle, based on the determination result of whether to switch the autonomous driving mode (S540) may include determining, by the processor, whether the user holds the steering wheel, when the collision risk is determined, when the acceleration input or the deceleration input is sensed, when a control amount of the acceleration input or the deceleration input does not exceed a preset threshold value, determining, by the processor, the collision risk in the steering direction of the steering wheel, when the user holds the steering wheel, and switching, by the processor, the autonomous driving mode to the manual mode, when the collision risk in the steering direction is not determined as being present.

According to an aspect of the present disclosure, an apparatus for controlling autonomous driving, may include a sensor device provided in a vehicle to acquire information on a collision risk during autonomous driving of the vehicle, a user input sensing device to sense a control input, which is input from a user of the vehicle, for switching an autonomous driving mode, and a processor executed through at least one instruction stored in a memory to determine a collision risk, based on the information acquired through the sensor device, to determine whether to switch the autonomous driving mode, based on the control input of the user, when the collision risk is determined as being present, and to control autonomous driving of the vehicle, based on a determination result of whether to switch the autonomous driving mode.

The sensor device may acquire information on at least one of a surrounding object of the vehicle, a speed of the vehicle, an acceleration of the vehicle, or a distance to the surrounding object.

The user input sensing device may sense at least one of an input for ending the autonomous driving, an input for steering, an input for acceleration, r an input for deceleration.

The processor may perform emergency avoidance control or emergency braking control through the autonomous driving, when the collision risk is determined as being present, and maintain autonomous driving mode based on the emergency avoidance control or the emergency braking control, even if a control input of the user to switch to a manual mode is sensed during the emergency avoidance control or the emergency braking control.

The processor may switch to the manual mode, when the autonomous driving mode based on the emergency avoidance control or the emergency braking control is maintained and when the collision risk is removed or the vehicle is stopped.

The processor may switch to the manual mode after a specific time is elapsed, when the autonomous driving mode based on the emergency avoidance control or the emergency braking control is maintained and when the collision risk is removed or the vehicle is stopped.

The processor may perform emergency avoidance control or emergency braking control through the autonomous driving, when the collision risk is determined as being present, and maintain an autonomous driving mode based on the emergency avoidance control or the emergency braking control, when the input for steering is sensed and when a control amount of the input for steering exceeds a preset threshold value.

The processor may determine the collision risk in a steering direction of the steering input, when the input for steering is sensed, and when the control amount of the input for steering does not exceed the preset threshold value, and maintain the autonomous driving mode based on the emergency avoidance control or the emergency braking control while reflecting the input for steering, when the collision risk is not determined as being present in the steering direction.

The processor may perform emergency avoidance control or emergency braking control through the autonomous driving, when the collision risk is determined as being present, and maintain an autonomous driving mode based on the emergency avoidance control or the emergency braking control while reflecting the input for deceleration, when the input for deceleration is sensed and when a control amount of the input for deceleration exceeds a deceleration control amount based on the emergency avoidance control or the emergency braking control.

The processor may determine whether the user holds a steering wheel, when the collision risk is determined, when the input for acceleration or the input for deceleration is sensed, and when a control amount of the input for acceleration or the input for deceleration does not exceed a preset threshold value, determine the collision risk in the steering direction of the steering wheel, when the user holds the steering wheel, and switch the autonomous driving mode to a manual mode, when the collision risk in the steering direction is not determined as being present.

The apparatus may include a display device to display information on switching the autonomous driving mode.

According to an aspect of the present disclosure, a method for controlling autonomous driving, may include acquiring, by a sensor device provided in a vehicle, information on a collision risk during autonomous driving of the vehicle, sensing, by a user input sensing device, a control input, which is input from a user of the vehicle, for switching an autonomous driving mode, determining, by a processor executed by at least one instruction stored in a memory, the collision risk, based on the information acquired through the sensor device, and determining, by the processor, whether to switch the autonomous driving mode, based on the control input of the user, when the collision risk is determined as being present to control autonomous driving of the vehicle, based on a determination result of whether to switch the autonomous driving mode.

The sensing, by the user input sensing device of the control input, which is input from the user of the vehicle, for switching the autonomous driving mode may include sensing, by the user input sensing device, at least one of an input for ending the autonomous driving, an input for steering, an input for acceleration, or an input for deceleration.

The method may further include performing, by the processor, emergency avoidance control or emergency braking control through the autonomous driving, when the collision risk is determined as being present. The determining, by the processor, whether to switch the autonomous driving mode, based on the control input of the user, when the collision risk is determined as being present to control the autonomous driving of the vehicle, based on the determination result of whether to switch the autonomous driving mode may include maintaining, by the processor, an autonomous driving mode based on the emergency avoidance control or the emergency braking control, even if a control input of the user to switch to a manual mode is sensed during the emergency avoidance control or the emergency braking control.

The determining, by the processor, whether to switch the autonomous driving mode, based on the control input of the user, when the collision risk is determined as being present to control the autonomous driving of the vehicle, based on the determination result of whether to switch the autonomous driving mode may further include switching, by the processor to the manual mode, when the autonomous driving mode based on the emergency avoidance control or the emergency braking control is maintained and when the collision risk is removed or the vehicle is stopped The determining, by the processor, whether to switch the autonomous driving mode, based on the control input of the user, when the collision risk is determined as being present to control the autonomous driving of the vehicle, based on the determination result of whether to switch the autonomous driving mode may further include switching, by the processor, to the manual mode after a specific time is elapsed, when the autonomous mode based on the emergency avoidance control or the emergency braking control is maintained and when the collision risk is removed or the vehicle is stopped The method may further include performing, by the processor, emergency avoidance control or emergency braking control through the autonomous driving, when the collision risk is determined as being present, and the determining, by the processor, whether to switch the autonomous driving mode, based on the control input of the user, when the collision risk is determined as being present to control the autonomous driving of the vehicle, based on the determination result of whether to switch the autonomous driving mode may include maintains an autonomous driving mode based on the emergency avoidance control or the emergency braking control, when the input for steering is sensed and when a control amount of the input for steering exceeds a preset threshold value.

The determining, by the processor, whether to switch the autonomous driving mode, based on the control input of the user, when the collision risk is determined as being present to control the autonomous driving of the vehicle, based on the determination result of whether to switch the autonomous driving mode may further include determining, by the processor, the collision risk in a steering direction of the steering input, when the input for steering is sensed, and when the control amount of the input for steering does not exceed the preset threshold value, and maintaining, by the processor, the autonomous driving mode based on the emergency avoidance control or the emergency braking control while reflecting the input for steering, when the collision risk is not determined as being present in the steering direction.

The method may further include performing, by the processor, emergency avoidance control or emergency braking control through the autonomous driving, when the collision risk is determined as being present. The determining, by the processor, whether to switch the autonomous driving mode, based on the control input of the user, when the collision risk is determined as being present to control the autonomous driving of the vehicle, based on the determination result of whether to switch the autonomous driving mode may include maintaining, by the processor, an autonomous driving mode based on the emergency avoidance control or the emergency braking control while reflecting the input for deceleration, when the input for deceleration is sensed and when a control amount of the input for deceleration exceeds a deceleration control amount based on the emergency avoidance control or the emergency braking control.

The determining, by the processor, whether to switch the autonomous driving mode, based on the control input of the user, when the collision risk is determined as being present to control the autonomous driving of the vehicle, based on the determination result of whether to switch the autonomous driving mode may include determining, by the processor, whether the user holds a steering wheel, when the collision risk is determined, when the input for acceleration or the input for deceleration is sensed, and when a control amount of the input for acceleration or the input for deceleration does not exceed a preset threshold value, determining, by the processor, the collision risk in the steering direction of the steering wheel, when the user holds the steering wheel, and switching, by the processor, the autonomous driving mode to a manual mode, when the collision risk in the steering direction is not determined as being present.

Figure 6:
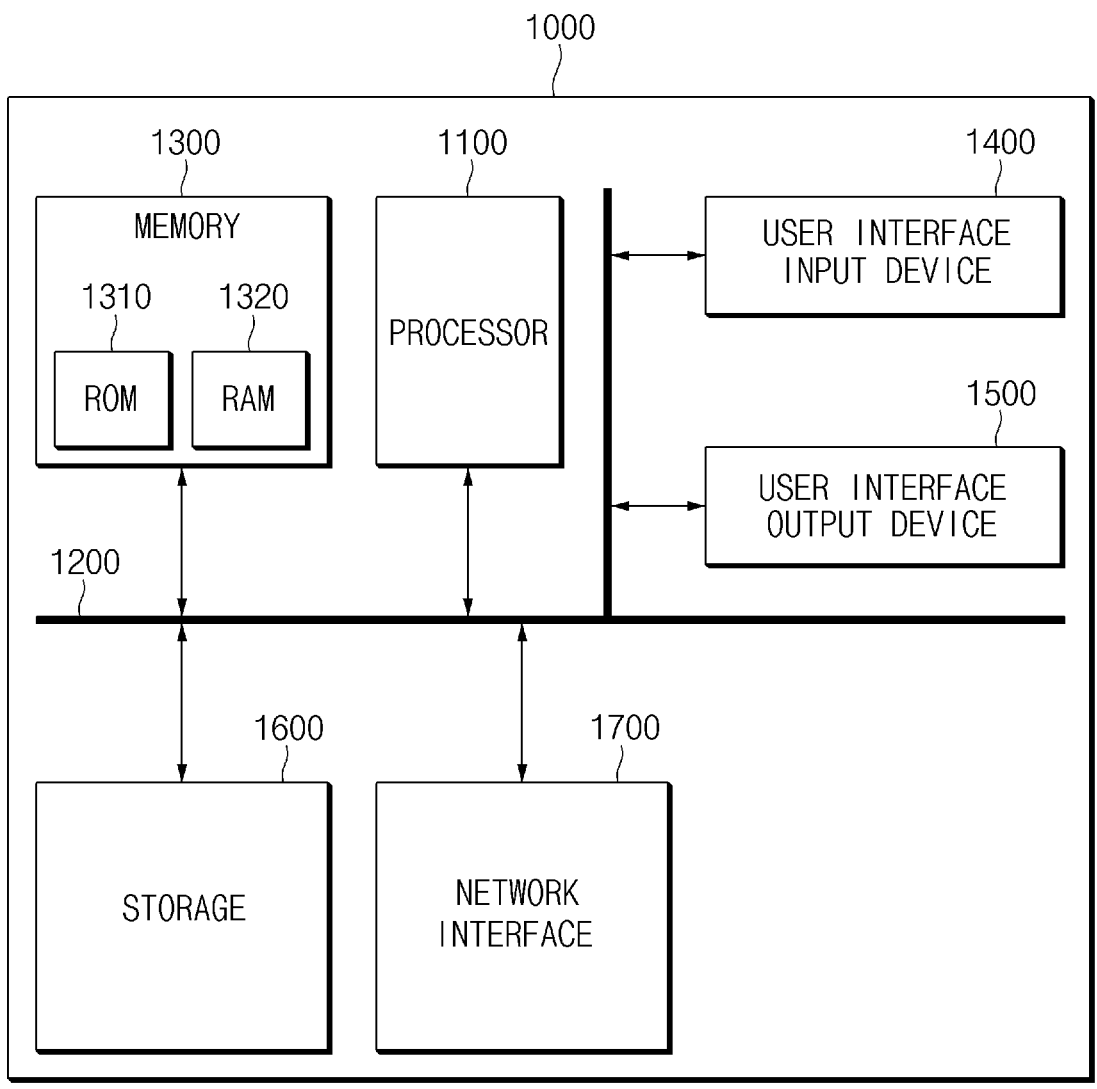
FIG. 6 illustrates a computing system.

FIG. 6 illustrates a computing system according to the present disclosure.

Referring to FIG. 6, a computing system 1000 may include at least one processor 1100, a memory 1300, a user interface input device 1400, a user interface output device 1500, a storage 1600, and a network interface 1700, which may be connected with each other via a bus 1200.

The processor 1100 may include a central processing unit (CPU) and/or a semiconductor device for processing instructions stored in the memory 1300 and/or the storage 1600. Each of the memory 1300 and the storage 1600 may include various types of volatile and/or non-volatile storage media. For example, the memory 1300 may include a read only memory (ROM) and a random access memory (RAM).

Thus, the operations of the methods and/or algorithms described in connection with the present disclosure may be directly implemented with a hardware module, a software module, or the combinations thereof, executed by the processor 1100. The software module may be stored on a storage medium (e.g., the memory 1300 and/or the storage 1600), such as a RAM, a flash memory, a ROM, an erasable and programmable ROM (EPROM), an electrically EPROM (EEPROM), a register, a hard disc, a removable disc, and/or a compact disc-ROM (CD-ROM).

The exemplary storage medium may be coupled to the processor 1100. The processor 1100 may read out information from the storage medium and may write information in the storage medium. Alternatively or additionally, the storage medium may be integrated with the processor 1100. The processor and storage medium may reside in an application specific integrated circuit (ASIC). The ASIC may be provided in a user terminal. Alternatively, the processor and storage medium may reside as separate components of the user terminal.

According to the present disclosure, the apparatus for controlling the autonomous driving and the method for the same may provide the following effects.

According to at least one of the aspects of the present disclosure, there may be provided an apparatus for controlling autonomous driving under a collision risk situation during the autonomous driving, and a method for the same.

According to at least one of the aspects of the present disclosure, there may be provided an apparatus for controlling driving, capable of improving the safety of an autonomous autonomous driving system under a collision risk situation, and a method for the same.

According to at least one of the aspects of the present disclosure, there may be provided an apparatus for controlling autonomous driving, capable of preventing a large risk caused when a user unintentionally makes a control input due to great kinetic energy resulting from emergency avoidance control and emergency braking control, and a method for the same.

According to at least one of the aspects of the present disclosure, there may be provided an apparatus for controlling autonomous driving, capable of switching to a manual mode only when safety is determined under a collision risk situation, even if a user intentionally switch to the manual mode during an emergency avoidance control and/or emergency braking control, and a method for the same.

According to at least one of the aspects of the present disclosure, there may be provided an apparatus for controlling autonomous driving, capable of reflecting both the safety of autonomous driving and the intent of a user, by reflecting only a portion of a control input of the user in controlling a vehicle, while considering a collision risk situation during autonomous driving, and a method for the same.

Further, a variety of effects directly or indirectly understood through the present disclosure may be provided.

The above description describes examples of the technical idea of the present disclosure, and various modifications may be made by one skilled in the art without departing from the essential characteristic of the present disclosure.

Hereinabove, although the present disclosure has been described with reference to various examples and the accompanying drawings, aspects of the present disclosure are not limited thereto, but may be variously modified and altered by those skilled in the art to which the present disclosure pertains without departing from the spirit and scope of the present disclosure claimed in the following claims.

What is claimed is:

1. An apparatus comprising:
a sensor device, of a vehicle, to acquire information associated with at least one collision risk during an autonomous driving of the vehicle;
a user input sensor device configured to sense, from a user of the vehicle, a control input associated with switching of an autonomous driving mode; and
a processor configured to:
during autonomous driving control of the vehicle in the autonomous driving mode, determine, based on the information acquired through the sensor device, a collision risk of the at least one collision risk;
determine whether to switch, from the autonomous driving mode to a manual mode, based on the control input and the determined collision risk; and
control, based on a determination whether to switch from the autonomous driving mode to the manual mode, the autonomous driving of the vehicle by:
determining at least one of an emergency avoidance control of the autonomous driving mode or an emergency braking control of the autonomous driving mode; and
while maintaining the autonomous driving mode, adjusting, based on a control amount of the control input, the at least one of the emergency avoidance control or the emergency braking control by at least partially applying the control input in adjusting the at least one of the emergency avoidance control or the emergency braking control.

2. The apparatus of claim 1, wherein the sensor device is configured to acquire information indicating at least one of: a surrounding object of the vehicle, a speed of the vehicle, an acceleration of the vehicle, or a distance to the surrounding object, wherein a minimum risk maneuver function of the autonomous driving mode comprises the emergency avoidance control and the emergency braking control, and wherein the processor is configured to activate, based on the determined collision risk satisfying a threshold risk, the minimum risk maneuver function.

3. The apparatus of claim 1, wherein the user input sensor device is configured to sense at least one of: an input for terminating the autonomous driving, an input for steering, an input for acceleration, or an input for deceleration.

4. The apparatus of claim 1, wherein the processor is further configured to:
perform, through a control of the autonomous driving of the vehicle and based on the collision risk, at least one of: the adjusted emergency avoidance control or the adjusted emergency braking control; and
maintain the autonomous driving mode based on at least one of: the adjusted emergency avoidance control or the adjusted emergency braking control, wherein a control input indicating a switch to the manual mode is sensed after initiating at least one of the emergency avoidance control or the emergency braking control.

5. The apparatus of claim 4, wherein the processor is further configured to:
after temporarily maintaining the autonomous driving mode based on the adjusted emergency avoidance control or the adjusted emergency braking control, switch to the manual mode, based on the collision risk being removed or the vehicle being stopped.

6. The apparatus of claim 4, wherein the processor is further configured to:
switch to the manual mode, after a specific time is elapsed, based on:
the emergency avoidance control or the emergency braking control being maintained; and
the collision risk being removed or the vehicle being stopped.

7. The apparatus of claim 1, wherein the processor is further configured to:
perform, through a control of the autonomous driving and based on the collision risk, at least one of the adjusted emergency avoidance control or the adjusted emergency braking control; and
maintain, based on the control input comprising a sensed input for steering, the autonomous driving mode based on at least one of: the adjusted emergency avoidance control or the adjusted emergency braking control, wherein a control amount of the sensed input for steering exceeds a preset threshold value, and wherein the sensed input for steering is at least partially ignored in adjusting the at least one of the emergency avoidance control or the emergency braking control.

8. The apparatus of claim 1, wherein the processor is further configured to:
determine, based on the control input comprising a sensed input for steering, whether the collision risk is associated with a steering direction of the sensed input for steering, wherein a control amount of the sensed input for steering does not exceed a preset threshold value; and
maintain the autonomous driving mode based on at least one of the adjusted emergency avoidance control or the adjusted emergency braking control, wherein the autonomous driving mode based on at least one of the adjusted emergency avoidance control or the adjusted emergency braking control is maintained based on an adjustment of the sensed input for steering and based on the collision risk not being associated with the steering direction, and wherein a reduced amount of the sensed input for steering is applied in adjusting the at least one of the emergency avoidance control or the emergency braking control.

9. The apparatus of claim 1, wherein the processor is further configured to:

perform, through a control of the autonomous driving and based on the collision risk, at least one of the adjusted emergency avoidance control or the adjusted emergency braking control; and maintain the autonomous driving mode based on at least one of the adjusted emergency avoidance control or the adjusted emergency braking control, wherein the autonomous driving mode based on the at least one of the adjusted emergency avoidance control or the adjusted emergency braking control is maintained based on an adjustment of a sensed input for deceleration and based on a control amount of the sensed input for deceleration exceeding a deceleration control amount, wherein the at least one of the adjusted emergency avoidance control or the adjusted emergency braking control adjusted based on the sensed input for deceleration is determined to reduce a risk of collision.

10. The apparatus of claim 1, wherein the processor is further configured to:

during autonomous driving control of the vehicle in the autonomous driving mode, activate, based on the collision risk, a minimum risk maneuver function of the autonomous driving mode;

during the minimum risk maneuver function being activated, determine a control amount of a sensed input for acceleration or a sensed input for deceleration;

determine that the user holds a steering wheel, based on:
the collision risk;
the sensed input for acceleration or the sensed input for deceleration; and
the control amount of the sensed input for acceleration or the sensed input for deceleration not exceeding a preset threshold value;

determine whether the collision risk is associated with a steering direction of the steering wheel, based on the determination that the user holds the steering wheel; and switch the autonomous driving mode to the manual mode, based on the collision risk not being associated with the steering direction.

11. The apparatus of claim 1, further comprising:

a display device configured to display information indicating a switching from the autonomous driving mode to the manual mode.

12. A method comprising:

acquiring, by a sensor device of a vehicle, information associated with at least one collision risk during an autonomous driving of the vehicle;

sensing, by a user input sensor device and from a user of the vehicle, a control input associated with switching of an autonomous driving mode;

during autonomous driving control of the vehicle in the autonomous driving mode, determining, by a processor of the vehicle and based on the information acquired through the sensor device, a collision risk of the at least one collision risk;

determining, by the processor, whether to switch, from the autonomous driving mode to a manual mode, based on the control input and the determined collision risk; and controlling, by the processor and based on a determination whether to switch from the autonomous driving mode to the manual mode, the autonomous driving of the vehicle by:

determining at least one of an emergency avoidance control of the autonomous driving mode or an emergency braking control of the autonomous driving mode; and while maintaining the autonomous driving mode, adjusting, based on a control amount of the control input, the at least one of the emergency avoidance control or the emergency braking control by at least partially applying the control input in adjusting the at least one of the emergency avoidance control or the emergency braking control.

13. The method of claim 12, wherein the sensing of the control input comprises:

sensing, by the user input sensor device, at least one of:
an input for terminating the autonomous driving, an input for steering, an input for acceleration, or an input for deceleration.

14. The method of claim 12, further comprising:

performing, through a control of the autonomous driving of the vehicle and based on the collision risk, at least one of: the adjusted emergency avoidance control or the adjusted emergency braking control, wherein the controlling the autonomous driving of the vehicle comprises:

maintaining, by the processor, the autonomous driving mode based on at least one of: the adjusted emergency avoidance control or the adjusted emergency braking control, wherein a control input indicating a switch to the manual mode is sensed during at least one of the emergency avoidance control or the emergency braking control.

15. The method of claim 14, further comprising:

after temporarily maintaining the autonomous driving mode based on the adjusted emergency avoidance control or the adjusted emergency braking control, switching, by the processor, to the manual mode, based on the collision risk being removed or the vehicle being stopped.

16. The method of claim 14, further comprising:

switching, by the processor, to the manual mode after a specific time is elapsed, based on:
the emergency avoidance control or the emergency braking control being maintained; and
the collision risk being removed or the vehicle being stopped.

17. The method of claim 12, further comprising:

performing, through a control of the autonomous driving and based on the collision risk, at least one of the adjusted emergency avoidance control or the adjusted emergency braking control, wherein the controlling the autonomous driving of the vehicle comprises:

maintaining, by the processor and based on the control input comprising a sensed input for steering, the autonomous driving mode based on at least one of: the adjusted emergency avoidance control or the adjusted emergency braking control, wherein a control amount of the sensed input for steering exceeds a preset threshold value, and wherein the sensed input for steering is at least partially ignored in adjusting the at least one of the emergency avoidance control or the emergency braking control.

18. The method of claim 12, wherein the determining whether to switch from the autonomous driving mode to the manual mode the collision risk comprises:

determining, by the processor and based on the control input comprising a sensed input for steering, whether the collision risk is associated with a steering direction of the sensed input for steering, wherein a control amount of the sensed input for steering does not exceed a preset threshold value; and wherein the controlling the autonomous driving of the vehicle comprises:

maintaining, by the processor, the autonomous driving mode based on at least one of the adjusted emergency avoidance control or the adjusted emergency braking control, wherein the autonomous driving mode based on at least one of the adjusted emergency avoidance control or the adjusted emergency braking control is maintained based on an adjustment of the sensed input for steering and based on the collision risk not being associated with the steering direction, and wherein a reduced amount of the sensed input for steering is applied in adjusting the at least one of the emergency avoidance control or the emergency braking control.

19. The method of claim 12, further comprising:

performing, through a control of the autonomous driving and based on the collision risk, at least one of the adjusted emergency avoidance control or the adjusted emergency braking control, wherein the controlling the autonomous driving of the vehicle comprises:

maintaining, by the processor, the autonomous driving mode based on at least one of the adjusted emergency avoidance control or the adjusted emergency braking control, wherein the autonomous driving mode based on the at least one of the adjusted emergency avoidance control or the adjusted emergency braking control is maintained based on an adjustment of a sensed input for deceleration and based on a control amount of the sensed input for deceleration exceeding a deceleration control amount, wherein the at least one of the adjusted emergency avoidance control or the adjusted emergency braking control adjusted based on the sensed input for deceleration is determined to reduce a risk of collision.

20. The method of claim 12, further comprising:

during autonomous driving control of the vehicle in the autonomous driving mode, activating, based on the collision risk, a minimum risk maneuver function of the autonomous driving mode;

during the minimum risk maneuver function being activated, determining a control amount of a sensed input for acceleration or a sensed input for deceleration;

determining, by the processor, that the user holds a steering wheel, based on:

the collision risk;

the sensed input for acceleration or the sensed input for deceleration; and the control amount of the sensed input for acceleration or the sensed input for deceleration not exceeding a preset threshold value;

determining, by the processor, whether the collision risk is associated with a steering direction of the steering wheel, based on the determining that the user holds the steering wheel; and switching, by the processor, the autonomous driving mode to the manual mode, based on the collision risk not being associated with the steering direction.

* * * * *